United States Patent [19]
Scheck et al.

[11] Patent Number: 5,382,076
[45] Date of Patent: Jan. 17, 1995

[54] SEAT FOR A MOTOR VEHICLE

[75] Inventors: Georg Scheck, Weitramsdorf; Reinhard Meschkat, Ahorn; Hans Rampel, Ahorn-Schorkendorf, all of Germany

[73] Assignee: Brose Fahrzeugteile GmbH & Co. KG, Coburg, Germany

[21] Appl. No.: 41,214

[22] Filed: Mar. 26, 1993

[30] Foreign Application Priority Data

Mar. 26, 1992 [DE] Germany .............. 4209770

[51] Int. Cl.$^6$ .............................................. B60N 2/02
[52] U.S. Cl. ............................ 297/354.12; 297/374
[58] Field of Search .............. 297/354.12, 374; 192/43, 45.2; 267/150

[56] References Cited

U.S. PATENT DOCUMENTS

| | | | |
|---|---|---|---|
| 3,117,771 | 1/1964 | Herr et al. | 267/150 |
| 4,366,983 | 1/1983 | Klueting et al. | 297/362 |
| 4,408,799 | 10/1983 | Bowman | 297/374 |
| 4,598,947 | 7/1986 | Fourrey et al. | 297/362 |
| 4,619,482 | 10/1986 | Itsnki | 297/355 |

FOREIGN PATENT DOCUMENTS

| | | | |
|---|---|---|---|
| 1914528 | 6/1970 | Germany | 297/374 |
| 3608858 | 10/1987 | Germany . | |
| 4123103 | 1/1993 | Germany . | |
| 2034923 | 6/1980 | United Kingdom | 297/354.12 |

Primary Examiner—Laurie K. Cranmer
Attorney, Agent, or Firm—Nils H. Ljungman & Associates

[57] ABSTRACT

The present device generally relates to a seat for a motor vehicle. The seat includes a back rest, seat cushion, and an arrangement for hingedly connecting the back rest with the seat cushion. The connecting arrangement includes an arrangement for producing a rotary movement which takes place optionally starting from a neutral position of a lever into either of two directions of rotation. Essentially, a shaft is only turned by way of the lever so long as the drive lever is moving away from the neutral position whereas, when the drive lever is swivelled towards its neutral position, the shaft is essentially not entrained. Cooperating elements exert different forces on the shaft.

20 Claims, 7 Drawing Sheets

SEAT FOR A MOTOR VEHICLE

BACKGROUND INFORMATION

1. Field of the Invention:

The invention relates to a seat for a motor vehicle, wherein the seat includes a back rest arrangement, a seat cushion arrangement and an arrangement for hingedly connecting the back rest arrangement with the seat cushion arrangement. The connecting arrangement includes a double-acting drive for producing a rotary movement which takes place optionally starting from a neutral position of a drive lever into one or other direction of rotation wherein the shaft is only turned by the drive so long as the drive lever is swivelled away from its neutral position whereas, when the drive lever is swivelled towards its neutral position the shaft is not entrained. Thus, the double-acting drive is included as part of a seat adjustment device.

2. Background Information:

An adjustment drive of the type just described, having an angle adjustable component in which the gearbox axis is mounted, is known from German Patent No. 36 08 858. An adjusting wheel with entrainment flanks is connected to this gearbox axis by an adjustment device which has two oppositely acting coil springs arranged concentrically with the gearbox axis. An operating arm is mounted concentric with the gearbox axis on this angle adjustable component. The two entrainment members of the operating arm which are designed as a double-armed levers engage with a handle which is mounted on an angle adjustable component and which engages these entrainment members and swivels the operating arm.

With a rotary joint fitment along the lines of that just described, the distance between the entrainment flanks is so large that during engagement a comparatively large angular stretch has to be covered in order to make up for an idle stretch. A fine-stepped engagement is thus not possible. A switch mechanism which is free of fixed operating steps and thus operates with infinite adjustment is described in German Patent No. 41 23 103. According to this a rocker lever is rotatably mounted on the separating arm on the angle bisector of two rays passing through the gearbox axis and rotary axes of the entrainment members. On one side the rocker lever has cams which engage with rocker levers of the entrainment members in order to lift the latter out of engagement with the gearing of the ratchet wheel, and on the other side the rocker lever has a control face.

This control face contains a central concave area and convex areas adjoining the concave area on each side to include an obtuse angle between same.

The outer surface of a slide pin connected to one of the two angle adjustable parts adjoins the control face wherein the neutral position of the operating arm the outer face of the slide pin adjoins the concave area of the control face. When operating the operating arm in one or other adjustment direction the rocker lever tilts so that through this design a response is obtained even with a very slight angular movement of the operating arm.

The disadvantage of this design lies in the relatively large structural space caused by the separately mounted levers. Owing to the principle of keyed engagement using detents, or pawls, whose division cannot be kept as small as required an idle path of the drive lever cannot be completely avoided.

OBJECT OF THE INVENTION

The object of the present invention is to develop an infinite drive which acts on both sides and which when the direction of movement is reversed, causes essentially no switching effects and, more particularly, creates essentially no noise during change-over. The design principle is preferably to be selectively very flat or just set up on the shaft diameter. It is intended that the friction moment is set automatically in dependence on the drive moment wherein self-locking must always preferably be maintained. During reverse movement of the drive lever into the neutral position the self-locking action is preferably to be lifted and the friction moment to be kept generally as small as possible.

Preferably, the double-sided drive is to operate with infinite movement without producing any change-over or operating noises. Through its restricted swivel movement, it essentially allows a corresponding rotary movement of the shaft which is to be driven, starting from a neutral position of a drive lever. The shaft is, however, essentially not entrained during reverse movement of the drive lever in the direction of its neutral position.

SUMMARY OF THE INVENTION

According to the invention, the actions described immediately hereinabove are achieved by using force-locking elements which when entering into the drive phase with the surface of the shaft to be driven have and retain a friction-conditioned self-locking effect. It is thereby ensured that the friction moment increases in dependence on the drive moment itself whereby even large forces can be transferred. During reverse movement of the drive lever in the direction of its neutral position, however, the self-locking action is lifted and the friction moment is generally kept as small as possible. Thus the shaft is essentially prevented from turning backwards. Controlling the conditions of the self-locking action is carried out by an elastic switch element, or spring, and a centering bolt.

The symmetrical arrangement of the force engagement areas of each force-locking element relative to the radial axis through each joint (tension bolts and holes), connecting the force-locking elements, guarantees, in conjunction with the elastic switch element (spring) and centering bolt, a substantially even tensioning of the force-locking elements both when operating the drive in one direction and in the other.

A swivel movement of the drive lever beyond its neutral position leads to spreading of the elastic switch element, designed as a spring tensioner, as a result of the widening angle between the centering bolt and pretensioning element. The tangentially acting force produced thereby is directed against the drive direction and, within the scope of the proposed play of the drive device, causes tilting and tensioning processes so that the self-locking action can become active and intensified.

When reversing the drive lever to the neutral position, the one spring end of the switch element exerts a tangential force on the force-locking elements by way of a bolt, whereby this force acts in the swivel direction of the drive lever, lifts the self-locking conditions and thus essentially prevents the shaft from jamming or turning back.

The principle of the invention can be executed in numerous ways. It can be assembled from individual thin disc-like components and thus has a very flat structure. At the same time, there is the choice of choosing between arranging the force-locking elements on the outer contour of the shaft or inside the hollow shaft which encloses the force-locking elements and thus presents a closed structural shape.

The articulated joints which connect the force-locking elements together or which connect the drive lever with the adjoining force-locking element or intermediate element are preferably designed particularly simply in the form of bolts or the like and holes into which they engage. If only rotary joints are provided, the holes can have a diameter which matches the bolts with little play. For rotary sliding joints, however, the play can be sufficiently large, or oblong holes can be used. Essentially, the use of intermediate elements increases the response sensitivity and functional reliability of the drive.

In order to improve the homogeneity of the force-locking engagement and to increase the functional reliability, the force-locking elements, for the flat method of construction, have the contour of a closed ring. An open ring can be advantageous as a flexible force-locking element which encloses the shaft for a major part and thus forms a very large force engagement surface. For inner force-locking elements it can be advantageous to choose the shape of a "heart" or isosceles triangle whose corners are rounded whereby the corners, mounted mirror-symmetrically relative to the axis of symmetry of the two equal length arms, have a contour suitable for engaging with the inner face of the hollow shaft.

At this stage, it should be pointed out that the use of adjustable, more particularly spring-elastic pretensioned eccentric-shaped tension bolts can in a way avoid the idle play when operating the drive.

In summary, one aspect of the invention resides broadly a seat for a moter vehicle, wherein the seat comprises a back rest arrangement, a seat cushion arrangement and an arrangement for hingedly connecting the back rest arrangement and the seat cushion arrangement. The connecting arrangement comprises a double-acting drive for producing a rotary movement which takes place optionally starting from a neutral position of a drive lever into one or other direction of rotation wherein the shaft is only turned by the drive so long as the drive lever is moving away from its neutral position whereas when the drive lever is swivelled towards its neutral position the shaft is not entrained, characterised in that two force locking elements 3a, 4, 4a, 5a, 6, 7, 8, 9, 10, 11 which exert substantially oppositely directed forces on the shaft 2, 20 are provided to connect the drive lever 3, 4a, 30, 30a, 300 and shaft 2, 20 wherein the force locking elements 3a, 4, 4a, 5, 5a, 6, 7, 8, 9, 10, 11 have force engagement areas 31, 41, 51, 61, 71, 81, 91 which and be brought into engagement with the cylindrical contour of the shaft 2, 20, and which have at least one articulated joint for interconnection, and that
 a) a rigid connection is provided directly between a force-locking element 3a, 5a and the drive lever 30, 30a) or
 b) an articulated connection
  b1) is provided directly between a force-locking element 5, 9 and the drive lever 3, 300 or
  b2) directly between two force-locking elements 4a, 5a and the drive lever 3a or
  b3) indirectly between two force-locking elements 6, 7 and 10, 11 or the drive lever 3, wherein when using several articulated connections at least one articulated joint is designed as a rotary slide joint.

BRIEF DESCRIPTION OF THE DRAWINGS

The invention will now be explained in detail with reference to some embodiments illustrated in the drawings in which.

DESCRIPTION OF THE PREFERRED EMBODIMENTS

Figure 1:
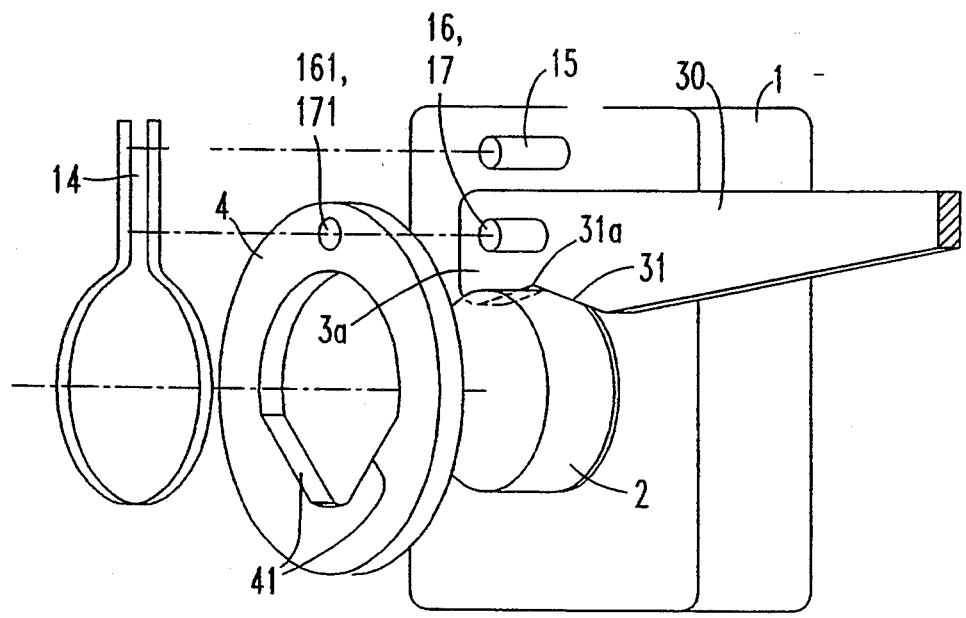
FIG. 1 shows a drive with rocker lever and a ring-shaped force-locking element (perspective explosive view)
Figure 2:
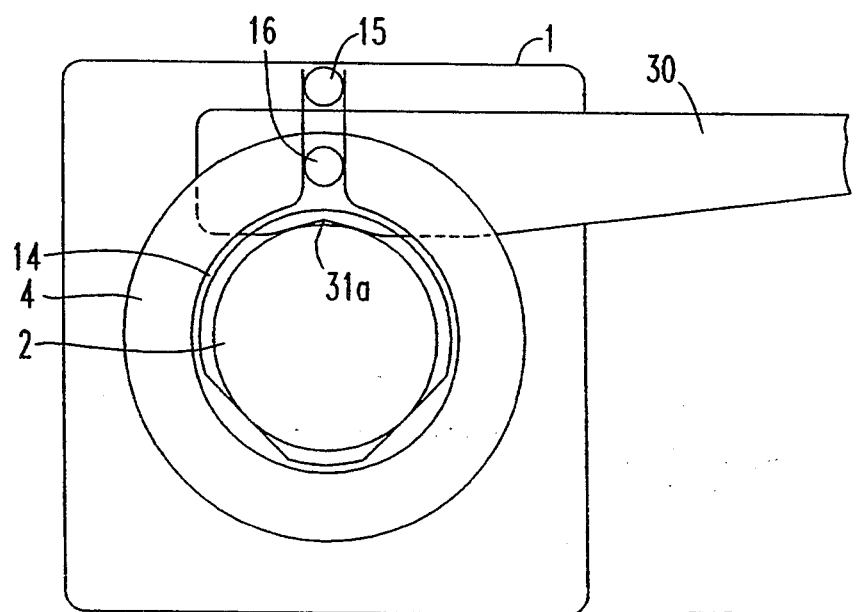
FIG. 2 is a front view of the drive according to FIG. 1.
Figure 1A:
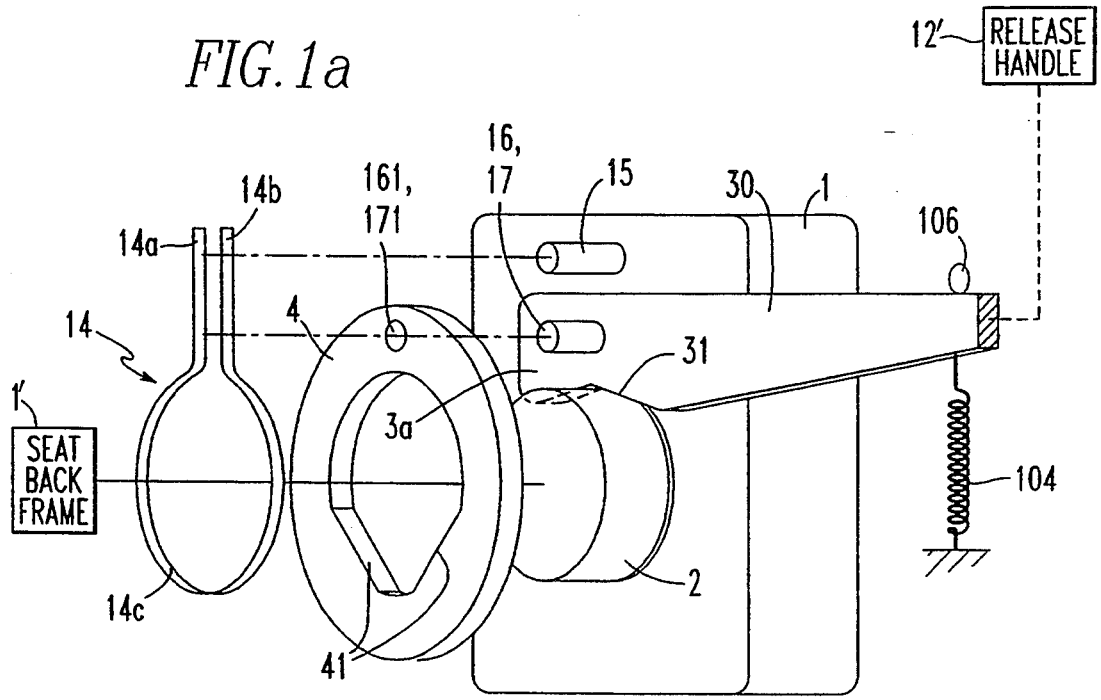
FIG. 1a is substantially the same view as FIG. 1, but with additional elements being referenced therein.
Figure 1B:
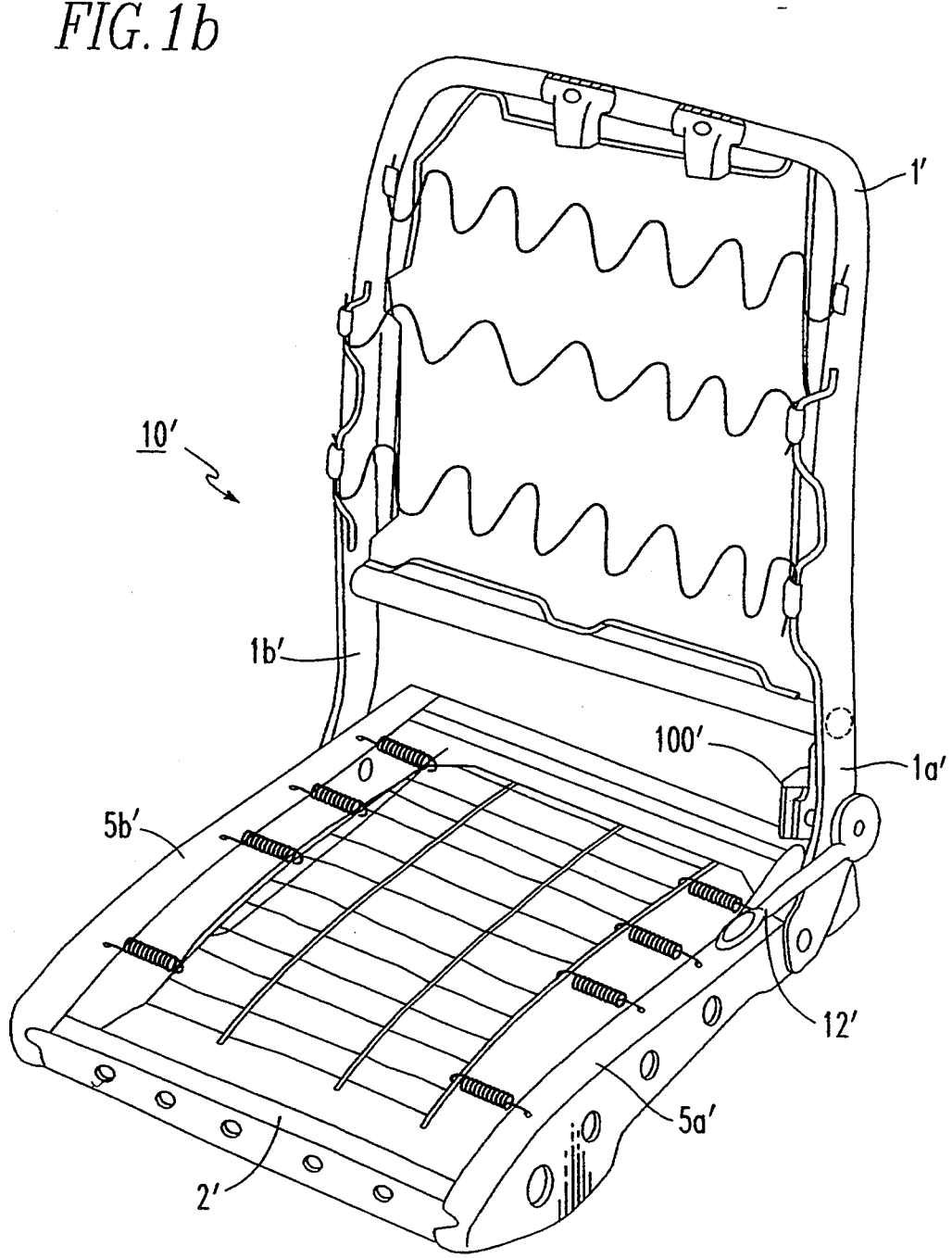
FIG. 1b shows a frame of a seat of a motor vehicle, which may be utilized in the present invention.

FIG. 1b illustrates, in perspective, a seat frame 10' of a seat on which a reclining device of the present invention may be mounted. In FIG. 1b, a back frame of a seat back is indicated at 1' and a cushion frame of a seat cushion is indicated at 2'. The back frame 1' may typically include two side leg portions 1a' and 1b', the lower ends of which leg portions may be respectively mounted to respective rear portions of two side base plates 5a' and 5b' of the cushion frame. A drive 100' for a reclining device may be located as shown and a release handle 12', connected with the drive 100', may be provided in order to recline the seat. A generally simple type of drive according to the invention is shown in FIGS. 1 and 2. A shaft end of a drive shaft 2 preferably projects through a bearing block 1. Force engagement faces 31 of a force-locking element 3a preferably form an obtuse angle together and are preferably mounted on an end of the drive lever 30 on the shaft side and face the cylindrical contour of the shaft 2. An entrainment and tensioning bolt 16, 17 is preferably mounted on the drive lever 30 symmetrically with respect to the force engagement faces. This bolt 16, 17 preferably projects through a round hole 161, 171 in a ring-like force locking element 4 and lies between the inner arms of an elastic switch element, or spring, 14. The centering bolt 15 is also preferably flanked by these spring arms. In the neutral position, the centering bolt 15 and the entrainment and tensioning bolt 16, 17 preferably lie on a common radial.

Particularly, as shown in both FIGS. 1 and 1a, an arrangement of the present invention, in a preferred embodiment thereof, preferably includes a bearing block 1 through which a drive shaft 2 is disposed. Preferably extending outwardly from bearing block 1 is a centering bolt 15, shown herein in the form of a simple cylindrical extension. A drive lever 30 is preferably disposed such that one end thereof is disposed, as shown, on shaft 2. The end of lever 30 disposed on shaft 2 will hereinafter be referred to as force-locking element 3a.

In a manner to be describe more fully below, shaft 2 preferably serves as a fulcrum for lever 30. To this end, lever 30 preferably includes a pair of force engagement surfaces 31. As shown, force engagement surfaces 31 are preferably constituted by a pair of generally planar surfaces meeting at an obtuse angle, on the underside of lever 30.

Inasmuch as FIGS. 1 and 2 illustrate lever 30 in a "neutral" or "rest" position, it will be appreciated that, preferably, while in that "neutral" position, both force engagement surfaces 31 of lever 30 preferably contact the periphery of shaft 2. Particularly, each force engagement surface 31 preferably contacts shaft 2 at a tangent. As also illustrated in FIGS. 1 and 2, while in the "neutral" position, an apex 31a, representing the intersection of force engagement surfaces 31, is preferably positioned substantially vertically above shaft 2 such that a vertically-oriented radius of shaft 2 preferably intersects apex 31a.

An entrainment and tensioning bolt 16, 17, preferably of a similar makeup as centering bolt 15, preferably extends outwardly from lever 30 at a position substantially directly above apex 31a. Thus, it will now be appreciated that, in the "neutral" position, centering bolt 15, entrainment and tensioning bolt 16, and apex 31a are all preferably in alignment with one another and with a substantially vertical radius of shaft 2.

Preferably mounted about shaft 2, but outwardly from lever 30, is a ring-like force-locking element 4. At an upper portion thereof, force-locking element 4 preferably has a generally round hole 161 for accommodating therewithin bolt 16, 17. At a lower portion thereof, on an interior periphery of the ring-like shape of the element 4, wedge-like contact faces 41 are preferably provided. As shown, these contact faces 41 preferably extend across the inner periphery of force-locking element 4 in the manner of secants. Preferably, the contact faces 41 exhibit symmetry with respect to a substantially vertical radius of shaft 2, wherein one contact face 41 is preferably disposed to one side of such a radius and the other contact face 41 is preferably disposed to the other side of such a radius.

Progressing further outwardly from force-locking element 4 along shaft 2, an elastic switch element, or spring, 14, is preferably disposed about shaft 2. As shown, such a spring 14 is preferably generally circular in nature, save for two arms 14a and 14b. These arms are illustrated more particularly in FIG. 1a.

Arms 14a and 14b of spring 14 preferably extend upwardly, and generally vertically, from a generally circular main body portion 14c of spring 14 when the lever 30 is in the "neutral" position. It will now be appreciated that bolts 15 and 16 both preferably extend sufficiently outwardly so as to be flanked by the arms 14a and 14b of spring 14 when in the "neutral" position, as shown.

When carrying out a swivel movement, the bolt 16, 17 essentially leaves the neutral position and presses against one arm of the spring 14 whilst the other arm is supported on the centering bolt 15. The spring force which is directed against the swivel movement thence essentially causes an increase in the radial force components wherein either the one or other force engagement face 31 comes to lie on the shaft 2 and by way of the bolt 16, 17 draws the ring-like force locking element 4 and its symmetrically arranged wedge-like contact faces 41 against the shaft 2.

The drive movement of the lever 30 is essentially converted into a rotary movement of the shaft 2 as soon as a self-locking action occurs between the force transfer faces 31, 41 and the surface of the shaft 2. When this is the case depends on the surface qualities, the geometric conditions including play, and on the spring constants of the elastic switch element 14. So that the aforesaid properties match each other, it is generally important to make sure that the self-locking action occurs essentially only with an adjoining counter force of the spring 14 and that, in reverse, the self-locking action essentially remains lifted for as long as the reversing movement is carried out, i.e. the force direction of the spring 14 acts in the same direction as the swivel movement of the drive lever 30.

It should be appreciated that, essentially, in a preferred embodiment of the present invention, a clamping force is provided about shaft 2 when a force engagement face 31 moves about shaft 2 and when, essentially simultanesouly, a contact face 41 is brought up against shaft 2. Essentially, this force comes about primarily due to the tendency of engagement face 31 and contact face 41 to come into greater contact with shaft 2 as the lever 30 is moved further. Thus, the relative angles of force engagement surfaces 31 and contact surfaces 41 are preferably such that an optimal self-locking, or binding, arrangement is provided for the operational context at hand.

It should be noted that the term "self-locking", as employed herein, should generally be taken to be indicative of a state in which clamping forces are effective about shaft 2. In preferred embodiments of the present invention, such clamping forces are effective in such a way as to essentially grasp shaft 2 so as to displace shaft 2 further. It will be apparent that, when the lever 30 is released after having so displaced shaft 2, the clamping faces in question will essentially release their grasp of shaft 2 so that, essentially, shaft 2 will not be displaced in a direction back towards the neutral position of lever 30 and will instead remain at the point of its furthest displacement from the neutral position of lever 30. It should also be noted that, once shaft 2 has been displaced to a desired position, any of several possible arrangements may be employed to hold the shaft in that position until it is next displaced. Such arrangements are generally well known to those of ordinary skill in the art and will not be discussed further here.

Figure 2A:
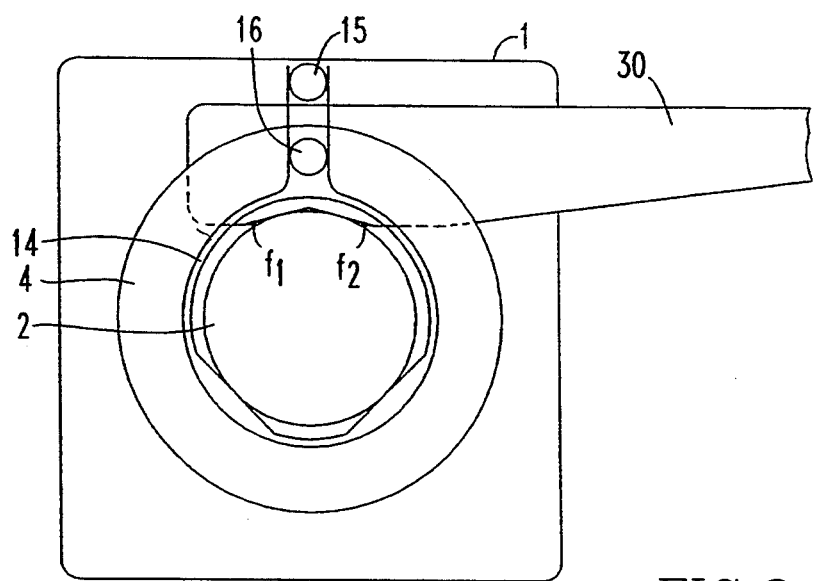
FIG. 2a is substantially the same view as FIG. 2, but with additional components being referenced therein.

With reference to FIG. 2a, it should be appreciated that lever 30 essentially displaces about different fulcrums when displaced in either direction along shaft 2. For example, when lever 30 is displaced upwardly, force engagement surface 31 essentially maintains contact with shaft 2 to form a type of fulcrum, indicated at $f_1$, for the movement of lever 30 about shaft 2. Likewise, when lever 30 is displaced downwardly, the opposite force engagement surface 31 essentially maintains contact with its corresponding side of shaft 2 to form another fulcrum area, indicated at $f_2$, for the movement of lever 30 about shaft 2.

As shown in FIG. 1a, lever 30 is preferably connected to a manually operable release handle 12′, which release handle is for being manipulated by the passenger or driver to effect reclination of the seat. Seat back frame 1′ is preferably appropriately connected with shaft 2 in order to undergo the desired reclining action. A possible arrangement for maintaining lever 30 in the neutral position, may include a biasing arrangement 104 and a stop 106. Particularly, biasing arrangement 104, which may include a spring, may be configured such that lever 30 is generally biased towards the neutral position, whether the lever has been displaced upwardly or downwardly. On the other hand, stop 106 may be provided, and configured, such that, once lever 30 is in the neutral position, whether having been displaced upwardly or downwardly, it remains in the neutral position until caused to displace again. Of course, it should be noted that, within the scope of the present invention, lever 30 may also be biased towards the neutral position by virtue of spring 14 and of similar springs disclosed in other embodiments hereinbelow.

It should be noted that it may be possible to employ the present invention as part of a power reclining arrangement. In one possible scenario, it may be possible to employ a spring solenoid as part of a biasing arrangement. Particularly, it may be possible for an operator to trigger an external switch, which could thence activate a solenoid to retract a biasing spring, or to even displace the lever 30 itself. In preferred embodiments of the present invention, however, the lever is manually operable and serves to clamp about shaft 2, to effect displacement of shaft 2, in a manner such as that described further above.

It will now be appreciated that the general principles of the "self-locking" or binding action described hereinabove are generally also applicable to the further embodiments of the present invention discussed hereinbelow. Thus, it will be noted that, although the further embodiments of the present invention may use essentially different configurations than that associated with the embodiment shown in FIGS. 1, 1a, 2 and 2a, the ultimate result of "self-locking" or binding is essentially similar.

Figure 3:
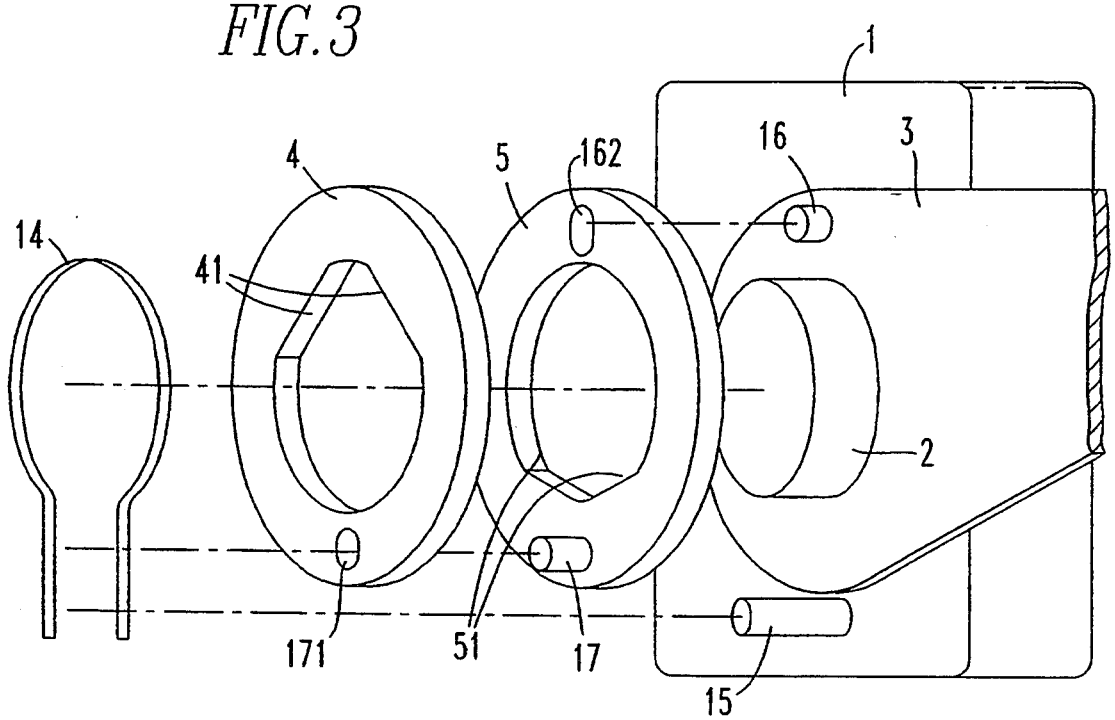
FIG. 3 shows a drive with two ring-shaped force-locking elements without an intermediate element (perspective explosive view)

A generally improved variation is shown in FIG. 3 wherein the lever is mounted on the shaft 2 and thereby has an accurate guide. The force-locking element 5 with its force engagement faces 51 corresponds in its method of operation substantially to the force-locking element 3a (FIG. 1) which is rigidly connected to the drive lever 30. Thus the tensioning bolt 17 engages in the round hole 171 of the adjoining force-locking element 4 whose force bearing faces 41 are opposite the force bearing faces 51 of the force-locking element 5. The joint formed by the bolt 17 and round hole 171 connects the two forceflocking elements 4, 5 together wherein the force engagement areas 41 of the force-locking element 4 are located on the side of the rotary-slide joint. In order to connect the drive lever 3 with the force-locking element 5 a rotary slide joint is provided which is preferably formed from the bolt 16 and oblong hole 162 and which lies on the opposite side of the force engagement areas 51.

The ends of the centering bolt 15 and tensioning bolt 17 are likewise preferably flanked by the arms of the spring 14. The coupling with the drive lever 3 is preferably undertaken by the entrainment bolt 16 and oblong hole 162.

Swivelling the lever 3 out of the neutral position, depending on the swivel direction, caused by the action of the spring 14 on the tensioning bolt 17, essentially leads to a tilting movement of the force-locking element 5 and causes one of the two force engagement areas 51 to adjoin the surface of the shaft 2. At the same time, the radially directed force components which emerge from the tensioning bolt 17 cause the force engagement areas 41 of the force locking element 4 to come to adjoining the shaft 2. The wedge angle between the force engagement area 51 and the shaft 2 leads to an increase in the force in the event of load on the drive side. When reversing the movement the clamping action is released and the spring force of the switch element 14 ensures that the force-locking elements 4, 5 can essentially become loose, i.e., due to the lifting of the self-locking, or binding, action, they can be returned in the non-tensioned state back up to the neutral position.

In a preferred embodiment of the present invention, oblong hole 162 may be considered to form, in conjuction with bolt 16, a rotary slide joint. Particularly, it is possible, within the scope of the present invention, that, as element 5 undergoes rotational movement in response to the displacement of lever 3, bolt 16 and oblong hole 162 undergo sliding displacement with respect to each other. Thus, it is possible, within the scope of the present invention, that bolt 16 essentially does not radially engage the inner surface of oblong hole 162 until such a time that element 5 has undergone at least some rotational movement. At that point, due to the radially-directed engagement of bolt 16 against hole 162, a displacement of element 5, with respect to shaft 2, will occur in such a way as to bring an engagement area 51 of element 5 into engagement with shaft 2. Preferably, bolt 16, hole 162 and bolt 17, as well as engagement areas 41 and 51, may also be configured such that, in response to displacement of lever 3, at least one engagement area 41 of element 4 will also come into contact with shaft 2. Thus, the binding or "self-locking" action, as described further above, will result.

Figure 4:
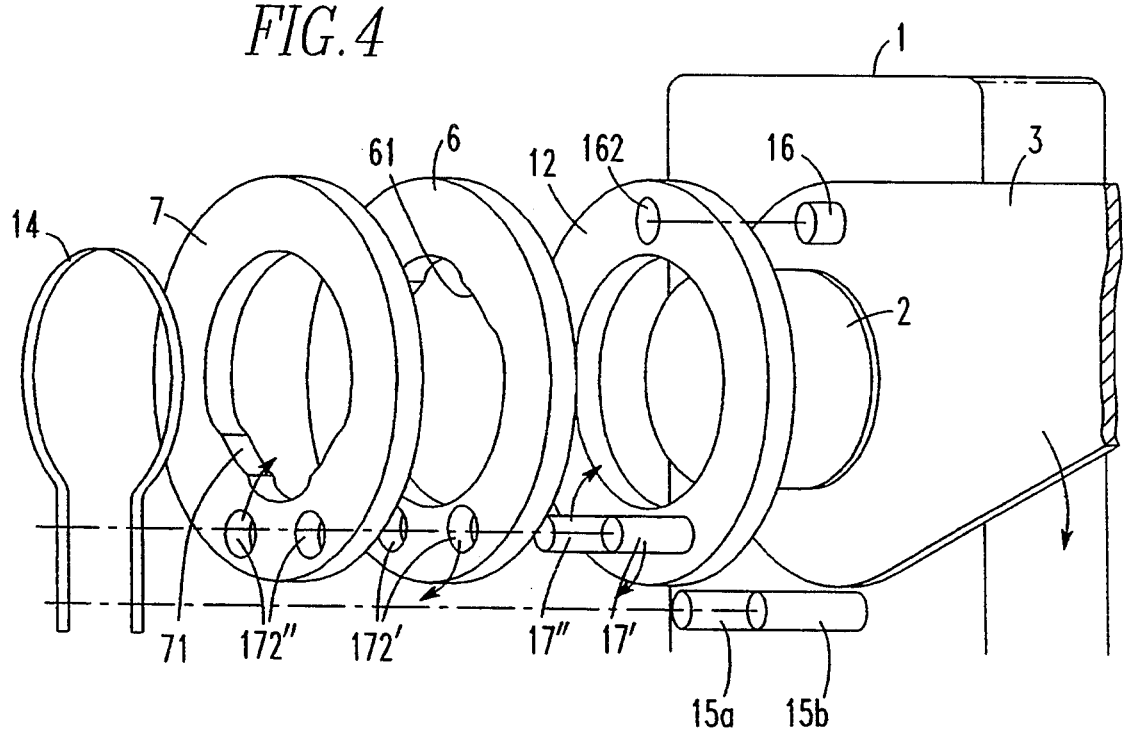
FIG. 4 shows a drive with two ring-shaped force-locking elements with an intermediate element (perspective explosive view)

FIG. 4 shows an embodiment with essentially more detailed function properties which is generally achieved by using an intermediate element 12 between the drive lever 3 and the force-locking elements 6, 7. Coupling the intermediate element 12 to the lever 3 is likewise preferably carried out by a rotary slide joint formed by the entrainment bolt 16 and oblong hole 162. Two tensioning bolts 17′ and 17″ are preferably arranged symmetrically opposite with a short spacing. These preferably engage in the pairs of holes 172′ and 172′ of the force-locking element 6, 7 and at their ends adjoin the arms of the spring 14. The holes 172′ and 172″ of the force-locking elements 6, 7 are preferably designed as rotary slide joints and preferably extend in the opposite direction starting from the longitudinal axes of the bolts 17. Whereas the holes 172′ of the force-locking elements 6 preferably extend in the direction of the opposite force engagement areas 61, the holes 172′ of the force-locking element 7 preferably have their projection in the opposite direction. Thus through a tilting movement of the intermediate element 12 only tensile forces can act on the force-locking element 6 and only compression forces can act on the force-locking element 7 which press the force engagement areas 71 against the shaft 2. Both force engagement areas 61, 71 preferably match the contour of the shaft 2 well enough so that they come to fit snug on same. Very large forces can thereby be transferred without damaging or even possibly destroying the surfaces.

To more particularly illustrate the orientation of holes 172' and 172", it will be noted that, preferably, holes 172' of element 6 are preferably at least slightly elongated radially inwardly with respect to the position of bolts 17' and 17" within the holes when lever 3 is in the neutral position. Conversely, holes 172" of element 6 are preferably at least slightly elongated radially outwardly with respect to the position of bolts 17' and 17" within the holes when lever 3 is in the neutral position. When a tilting movement of intermediate element 12 occurs in the direction of the arrows as shown in FIG. 4, essentially, because of the shape and orientation of holes 172' and 172", essentially only tensile forces, or forces directed radially outwardly, can be directed on element 6 and essentially only compressive forces, or forces directed radially inwardly, can be directed on element 7. If a tilting movement of intermediate element 12, from the neutral position, occurs in a direction opposite that of the arrows as shown in FIG. 4 then, essentially only tensile forces will still be directed on element 6 and essentially only compressive forces will still be directed on element 7. However, in such an instance, the forces will be transferred through a different hole 172' and 172" for each element 6 and 7.

In order to explain the method of operation of this drive, the force or directions of movement of the force-locking elements 6, 7 and intermediate element 12 when the drive lever 3 is swivelled downwards are shown by arrows in FIG. 4.

Thus if the lever 3 is swivelled in the direction of the arrow then the spring 14 presses against the tensioning bolt 17" whereby the intermediate element 12 which essentially sits with play on the shaft 2 and is mounted in the rotary slide joint 16–162 carries out a tilt movement. The tensioning bolt 17" thereby essentially moves towards the shaft 2 and presses the force-locking element 7 via the hole 172" against shaft 2 whilst the tensioning bolt 17' is essentially removed in a direction away from the shaft 2 and draws the force-locking element 6 over the holes 172' onto same. An advantage of using an intermediate element 12 is that greater clamping forces can be transferred through larger contact surfaces of the element 7, whereby the dimensions of the clamping forces tend to depend substantially on the spacing between the tensioning bolts 17' and 17".

During the reverse movement of the lever 3 the force-locking elements 6, 7 are essentially loosely entrained. It essentially cannot result in clamping because the pressure of the spring 14 on the clamping bolt 17" prevents the self-locking or binding action from coming into effect. The intermediate element can essentially only tilt in the other direction when the neutral position is exceeded and the spring 14 presses on the other tensioning bolt 17'. The resulting actions essentially correspond exactly to those described above.

Figure 5:
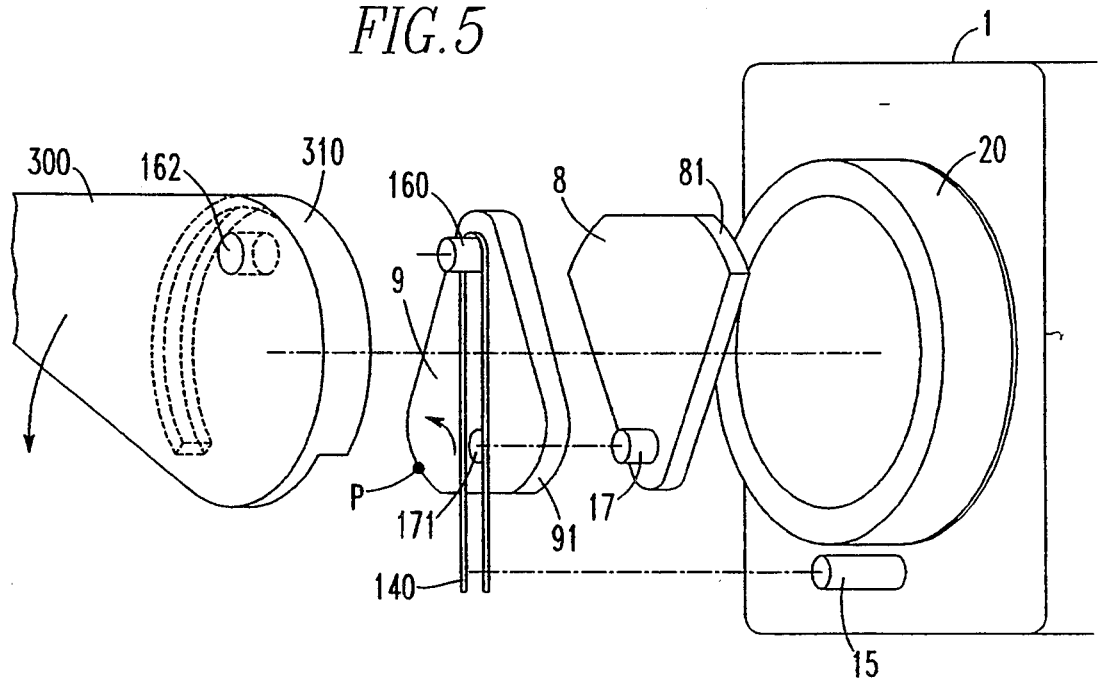
FIG. 5 shows a drive with two force elements lying inside a hollow shaft (perspective explosive view)

FIG. 5 shows an embodiment of the invention with force-locking elements 8, 9 which are preferably substantially heart-shaped or triangular and are mounted inside a hollow shaft 20. They preferably have symmetrically arranged force engagement areas 81, 90 whose contour is preferably adapted to the curvature of the inner wall of the hollow shaft.

Also these force-locking elements 8, 9 are preferably connected together by a tensioning bolt 17 and round hole 171 and to the lever 300 by the entrainment bolt 160 and oblong hole 162. The entrainment bolt 160 at the tip of the force-locking element 9 preferably forms a rotary slide joint with the oblong hole 162. A hairpin spring 140 is preferably hung from the entrainment bolt 160 whereby the end of the tensioning bolt engages in the spring.

The lever 300 preferably has a collar attachment 310 which opens downwards and which is mounted central relative to the swivel axis. Preferably, the collar attachment on the one hand supports the lever 300 in the hollow shaft 20 and on the other allows free passage of the hairpin spring 140 so that this can be supported on the centering bolt 15.

During downward swivel movement of the lever 300 the spring force causes the force-locking element 9 connected to the lever 300 to tilt about the point P in the direction of the arrow. Furthermore this tilt movement essentially leads to a radially inwardly directed translation of the round hole 171 and thus through the tensioning bolt 17 to the force transfer areas 81 pressing against the inner wall of the hollow shaft 20. During this, essentially only the force contact area 91 of the force-locking element 9 is adjoining about whose point P the latter is tilted. Thus a 3-point support is essentially always guaranteed. Downward swivel movement of lever 300, as well as the tilting movement about point P, are indicated by arrows in FIG. 5.

If now the movement is reversed, i.e. a swivel movement is carried out in the direction of the neutral position then the clamping state is lifted and the force-locking elements 8, 9 can be loosely moved back. Essentially, only when the neutral position is exceeded does the spring force which is now acting in the opposite direction cause the force-locking element 9 to tilt into one or other direction so that the opposite force engagement area 91 becomes part of the 3-point support.

To more particularly illustrate some components shown in FIG. 5, essentially, hollow shaft 20 is generally cylindrically and annular in shape and extends outwardly from bearing block 1. Thus, as shown, force-locking elements 8 and 9 are preferably configured to act on an inner annular surface of hollow shaft 20.

Lever 300 preferably has an oblong hole 162 disposed therein and a collar attachment 310 extending therefrom. Collar attachment 310 is preferably configured such that it fits within the inner annular surface of hollow shaft 20 to permit rotational displacement of collar attachment 310 with respect to shaft 20. Bolt 160 preferably extends from element 9 into hole 162, whilst bolt 17 preferably extends from element 8 through hole 171 in element 9. In extending through hole 171 of element 9, bolt 17 is preferably thence flanked by the arms of hairpin spring 140. It will be appreciated that hairpin spring 140 is preferably configured to provide force moments in a manner substantially similar to the spring elements previously discussed in other embodiments of the present invention.

Figure 6:
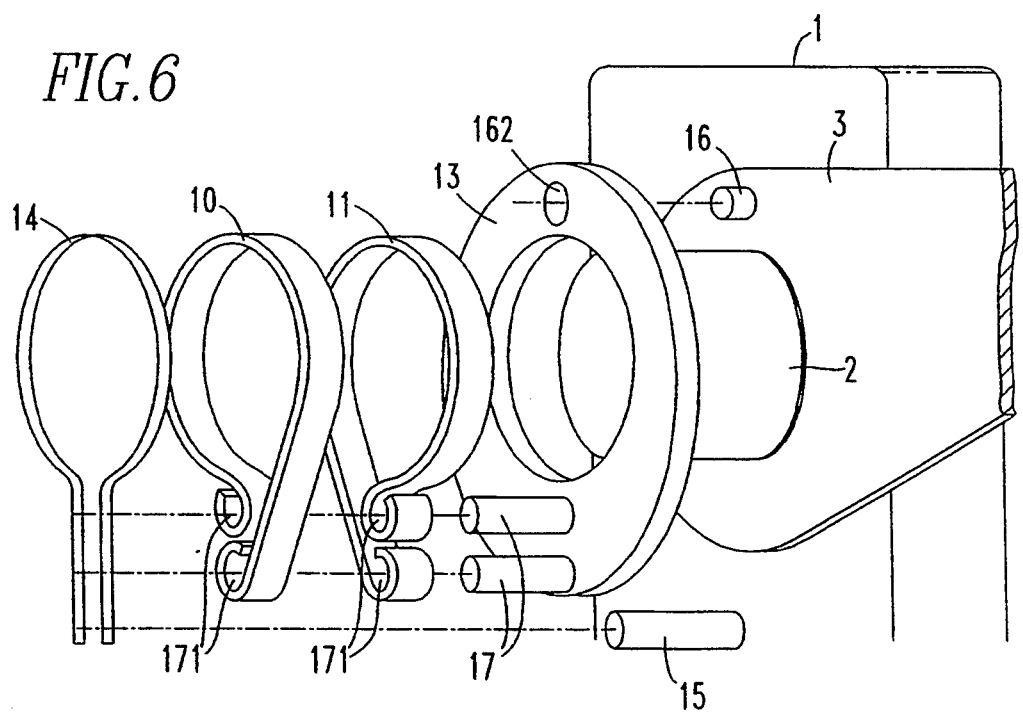
FIG. 6 shows a drive with two flexible force-locking elements and intermediate element (perspective explosive view)

The embodiment according to FIG. 6 essentially has a special position compared to the variations described above because this uses flexible force-locking elements 10, 11, preferably those designed as a flat band. They are preferably structurally identical and are arranged turned sideways relative to each other. Their ends are preferably curved round and form holes 171 through which the tensioning bolts 17 of an intermediate element 13 engage. On the opposite side of the intermediate element 13 there is preferably an oblong hole 162 in which an entrainment bolt 16 of the drive lever 3 engages and forms a rotary slide joint. The spring-elastic switch element 14 is preferably supported on the centering bolt 15 and also embraces the two tensioning bolts 17.

Like the variation described in FIG. 4, the intermediate element 13 which is set with play relative to the shaft 2, preferably completes a tilting movement in one or other direction in dependence on the swivel direction of the lever 3. This thereby essentially leads to tensioning of one of the flexible force-locking elements 10, 11 on the shaft 2 whilst the other is opened. The shaft 2 is essentially entrained until reverse movement of the lever 3 is initiated which releases the tensioned force-locking element 10, 11. On exceeding the neutral position, the events described in relation to the force-locking elements 10, 11 essentially take place in reverse.

In one possible configuration of the embodiment of the present invention illustrated in FIG. 6, tensioning bolt 17 may be configured eccentrically. Essentially, the design of the tensioning bolt 17 as an eccentric is not shown in the diagrams. If tensioning bolt 17 is configured as. an eccentric, its function thence essentially resides in reducing the play and thus in reducing the idle stroke of the drive lever 3. Adjustable eccentrics may also be suitable for compensating manufacturing tolerances in a wide area. This can avoid the use of expensive precision tools. Spring-elastic pretensioned self-adjusting eccentrics may essentially allow the play to be completely removed in a way which, by avoiding an idle stroke, may essentially lead to an effective utilization of the available swivel area of the drive lever 3.

It will be appreciated that, in accordance with the embodiment of the present invention illustrated in FIG. 6, a force-locking element 10 and 11 may essentially undergo a constrictive action in response to the displacement of lever 3, wherein such constrictive action would essentially increase as a function of the displacement of lever 3 and serve to provide the desired binding or self-locking action.

Finally, two further embodiments of the invention will now be explained with reference to the variations shown in FIGS. 7 and 8.

As shown, the spring 14 is preferably mounted on the shaft 2 set in the bearing block 1 (of FIG. 7) so that their free arms preferably lie under pretension on the centering bolt 15. The centering bolt 15 is preferably fixedly connected by a push-in connection to the bearing block 1. The force-locking elements 4a and 5a, which are preferably likewise mounted on the shaft 2, are preferably rotatably connected together by the tensioning bolt 17 and hole 171. Preferably, on the side opposite this connection, the force-locking element 4a supports an entrainment slide 52 in which an entrainment cam 16c of the tension lever 18 engages. The other force-locking element 5a is preferably fixedly connected to the drive lever 30a which supports an entrainment bolt 16a. This bolt 16a preferably engages in the hole 19 of the tension lever 18. The tension lever 18 furthermore preferably supports a further entrainment bolt 16b between the hole 19 and entrainment cam 16c, which bolt 16b, like the bolt 15, is preferably positioned between the arms of the spring 14. In order to produce a clamping action and thus to transfer the drive forces, the force-locking elements 4a, 5a preferably have force engagement areas 41, 51 which each lie diametrically opposite one another. Thus, the force-locking element 5a on the side remote from the lever 30a preferably has the force engagement areas 51 and the force-locking element 4a on the opposite side preferably has the force engagement areas 41.

When the drive lever swivels out, e.g. down from its neutral position, the entrainment bolt 16a essentially produces a swivel movement of the tension lever 18 through the hole 19 and through the effect of the lower arm of the spring 14 on the entrainment bolt 16b. This swivel movement thence essentially leads to the turning of the force-locking element 4a in the opposite direction to the swivel movement of the drive lever 30a. Since the two force-locking elements 4a and 5a are essentially connected together in rotation by the tension bolt 17 and hole 171, this essentially leads to clamping of the force-locking elements 4a and 5a on the shaft 2 through the force-locking areas 41, 51 whereby a force transfer is possible to entrain the shaft 2 in the direction of the swivel movement of the lever 30a.

Figure 7:
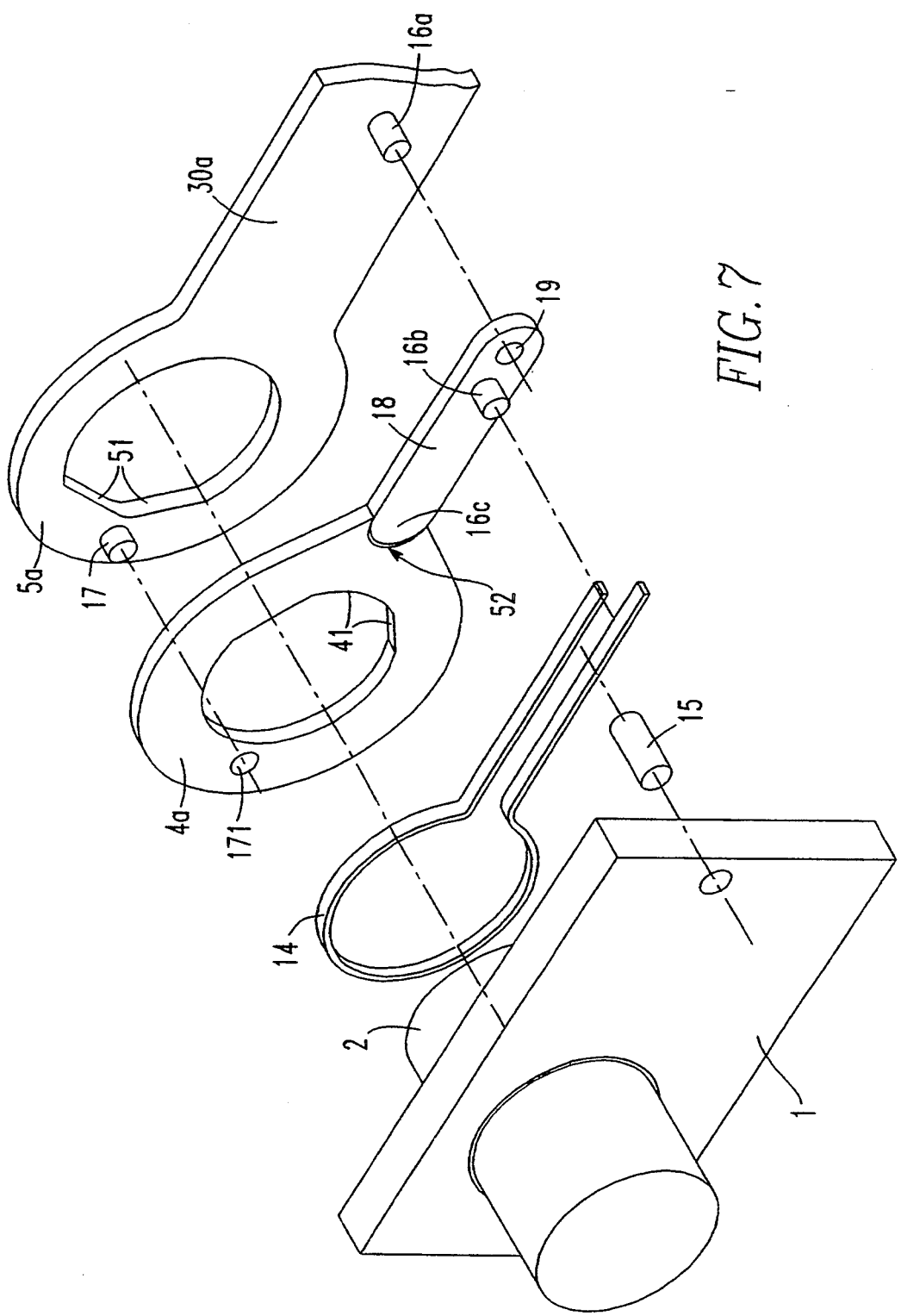
FIG. 7 shows a drive with two ring-shaped force-locking elements and a tensioning lever wherein the drive lever is connected to a force-locking element (perspective explosive view)
Figure 8:
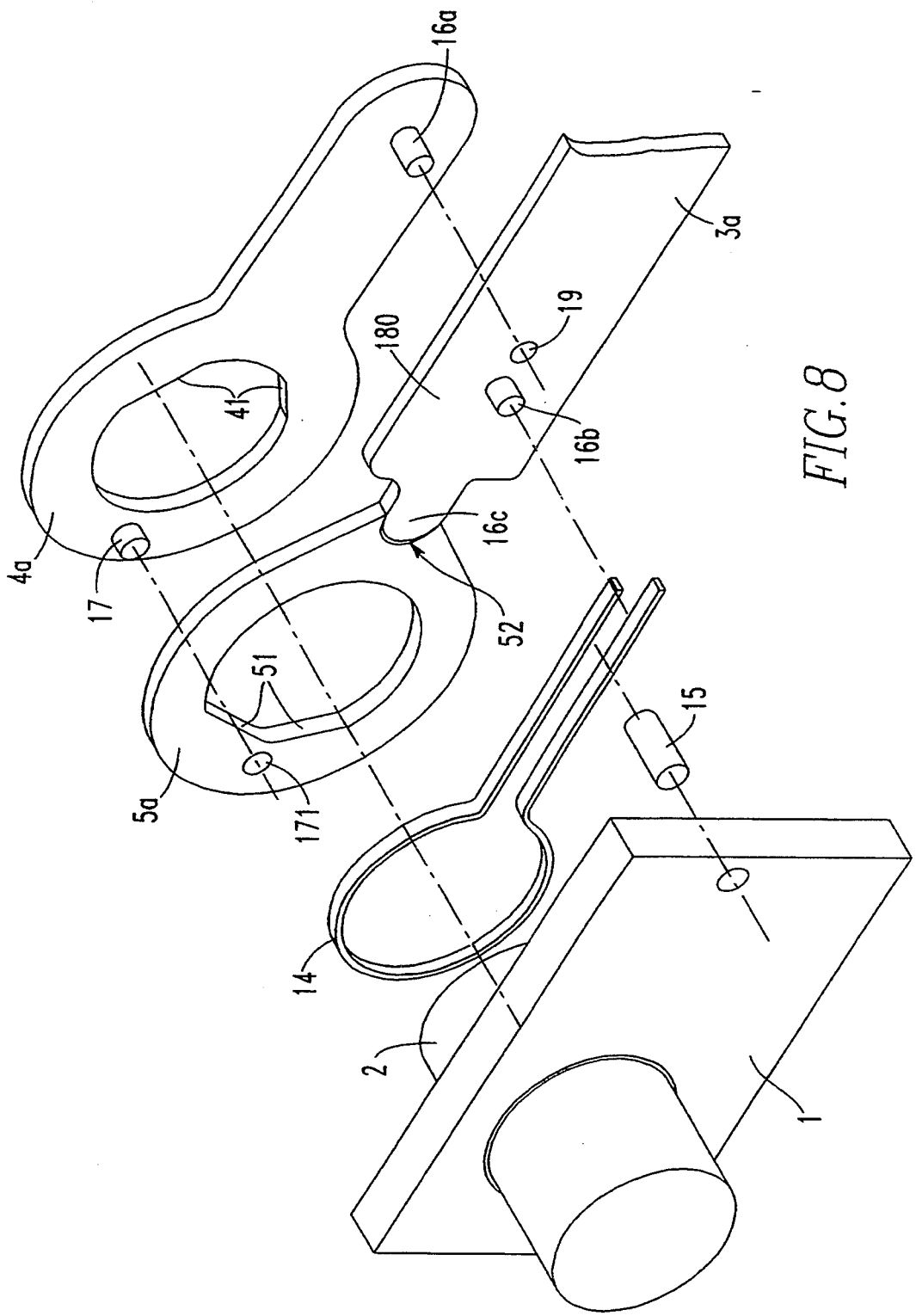
FIG. 8 shows a drive with two ring-shaped force-locking elements and a tensioning lever which is fixedly connected to the drive lever (perspective explosive view).

The variation shown in FIG. 8 essentially differs from the embodiment of FIG. 7 only in the position of the drive lever 3a. Particularly, in the embodiment of FIG. 8, the drive lever is preferably not connected to the force-locking element 5a as with the embodiment of FIG. 7, but to tension lever 180. Also, this tension lever 180 preferably has at its free end an entrainment cam 16c which preferably engages in the entrainment slide 52 of the force-locking element 5a.

In the event of swivel movement, the drive lever 3a which is supported in the pretensioned spring 14 by the tensioning bolt 16b essentially causes, via the entrainment bolt 16a and hole 19, a rotary movement of the force-locking element 4a in the same direction and a rotary movement of the force-locking element 5a in the opposite direction. The tension movement is then essentially stopped when the force-locking areas 41, 51 adjoin the shaft 2. During further swivel movement of the drive lever 3a, the shaft 2 is essentially entrained by the force-locking elements 4a, 5a and the arm of the spring 14 supporting the entrainment bolt 16b is essentially moved in the same direction by increasing the spring force. During return movement of the drive lever in the direction of its neutral position, the tensioning of the force-locking elements 4a, 5a is essentially released and its force engagement areas 41, 51 essentially slide back on the shaft 2. If a sufficiently strong spring 14 is used, then spring 14 can essentially automatically undertake the return of the drive lever.

Generally, the invention relates to a double-acting drive for producing a rotary movement which takes place optionally starting from a neutral position of a drive lever into one or other direction of rotation wherein the shaft is only turned by the drive so long as the drive lever is swivelled towards its neutral position the shaft is not entrained. Such a double-acting drive is particularly suitable for use in vehicle seat adjustment devices.

In further recapitulation, the invention relates to a double side and infinitely operating drive, more particularly for adjustment devices in motor vehicles, in order to produce a rotary movement which takes place selectively starting from a neutral position into one or other direction of rotation, without drawing the shaft back again during reverse movement of the drive lever. According to the invention this is achieved by using two force-locking elements 4, 5 which exert substantially oppositely directed forces on the shaft 2 and connect this to the drive lever 3. The force-locking elements 4, 5 have force engagement areas 41, 51 which can be brought into engagement with the cylindrical contour of the shaft 2. They are connected together by at least one articulated joint wherein one force-locking element 5 is in active connection with the drive lever 3. (FIG. 3).

One feature of the invention resides broadly in the double-acting drive for producing a rotary movement which takes place optionally starting from a neutral position of a drive lever into one or other direction of rotation wherein the shaft is only turned by the drive so long as the drive lever is moving away from its neutral position whereas when the drive lever is swivelled towards its neutral position the shaft is not entrained, characterised in that two force locking elements 3a, 4, 4a, 5a, 6, 7, 8, 9, 10, 11 which exert substantially oppositely directed forces on the shaft 2, 20 are provided to connect the drive lever 3, 4a, 30, 30a, 300 and shaft 2, 20 wherein the force locking elements 3a, 4, 4a, 5, 5a, 6, 7, 8, 9, 10, 11 have force engagement areas 31, 41, 51, 61, 71, 81, 91 which and be brought into engagement with the cylindrical contour of the shaft 2, 20, and which have at least one articulated joint for interconnection, and that a) a rigid connection is provided directly between a force-locking element 3a, 5a and the drive lever 30, 30a) or b) an articulated connection b1) is provided directly between a force-locking element 5, 9 and the drive lever 3, 300 or b2) directly between two force-locking elements 4a, 5a and the drive lever 3a or b3) indirectly between two force-locking elements 6, 7 and 10, 11 or the drive lever 3, wherein when using several articulated connections at least one articulated joint is designed as a rotary slide joint.

Another feature of the invention resides broadly in the double-acting drive, characterised in that one force-locking element 3a is rigidly connected to the drive lever 30 and is designed as a two-sided rocker lever whose lever ends forms force engagement areas 31 with the outer cylindrical contour of the shaft 2 wherein an articulated joint is mounted in the axis of symmetry of the rocker lever of the force-locking element 3a.

Yet another feature of the invention resides broadly in the double-acting drive, characterised in that the force-locking elements 4, 4a, 5, 5a, 6, 7, 10, 11 completely enclose the shaft 2 with an angle greater than 180°, preferably as a closed ring, wherein its inner contour is designed in the form of a wedge or partial circular surface to form force engagement areas 41, 51, 61, 71 with the cylindrical contour of the shaft 2.

Still another feature of the invention resides broadly in the double-acting drive, characterised in that the drive lever 3 is connected by the rotary slide joint, which is advantageously formed by a bolt 16 and an oblong hole 162, with the one force-locking element 5 whose force engagement areas 51 lie on the opposite side of the shaft 2 on which a further articulated joint, preferably formed by a bolt 17 and round hole 171 connects the two force-locking elements 4, 5 together whereby the force engagement areas 41 of the second force-locking element 4 lie on the side of the rotary slide joint.

Still yet another feature of the invention resides broadly in the double-acting drive, characterised in that the intermediate element 12, 13 is connected on one side by a rotary slide joint, preferably formed by the bolt 16 and oblong hole 162, to the lever 3 and on the other side by two further rotary slide joints, preferably formed by the bolt 17 and holes 171, 72, to the force-locking elements 6, 7 and 10, 11.

An additional feature of the invention resides broadly in the double-acting drive, characterised in that the drive lever 3 is mounted concentric on the shaft 2 and is connected by a rotary slide joint to an intermediate element 12 which has tow bolts 17 which are mounted at a distance from each other in dependence on the friction value between the force engagement faces 61, 71 and shaft 2 and engage in openings 172 of the two force-locking elements 6, 7 and thus form rotary slide joints, and that the force engagement faces 61 of that force-locking element 6 which is drawn in the direction of the bolt 17 lie on that side of the shaft axis 2 whilst the force engagement surfaces 71 of the other force-locking element 7 which is pressed away from the bolt onto the shaft 2 lie on this side of the shaft axis.

A further feature of the invention resides broadly in the double-acting drive, characterised in that the paris of openings 172 of the one force-locking element 6 extend, starting from the circular arc on which the bolts 17 lie, in the direction of the shaft axis 2, and the openings 172 of the other force-locking element 7 extend in the opposite direction, and that the width of the openings 172 is greater than the diameter of the bolt 17.

Another feature of the invention resides broadly in the double-acting drive according to claim 1 characterised in that the two force-locking elements 8, 9 are preferably heart-shaped and are mounted inside a hollow shaft 20 wherein they have force engagement areas 81, 91 set symmetrical with their wide side and the cylindrical contour of the hollow shaft 20, and that the entrainment bolt 16 forms at the tip of the heart-shaped force-locking element 9 with the oblong hole 162 of the lever 100 a rotary slide joint whilst the tensioning bolts 17 set on the tip of the force-locking element 8 engages in the round hole 171 in the wide side of the other force-locking element 9.

Yet another feature of the invention resides broadly in the double-acting drive, characterised in that the force-locking elements 10, 11 are flexible, e.g. designed as bands, cables or the like, and loop round the shaft 2, and that their ends each have an opening to take the tensioning bolts 17 which are mounted radially and at a distance on an intermediate element 13 and to which the ends of the force-locking elements 10, 11 are alternately connection.

Still another feature of the invention resides broadly in the double-acting drive, characterised in that the articulated joints 171, 172 are mounted on a preferably ring-like intermediate element 12, 13 with which is associated on the opposite side a rotary slide joint 162 for fixing the intermediate element 12, 13 on the drive lever 3.

Yet still another feature of the invention resides broadly in the double-acting drive, characterised in that an elastic switch element 14, 140 is used which during swivel movement of the drive lever 3 exerts a force directed against the swivel direction on the tensioning bolt 17 of the force-locking elements 3a, 5, 8 in dependence on the swivel direction.

Another feature of the invention resides broadly in the double-acting drive, characterised in that the elastic switch element 14 is designed as a leg spring looping round the shaft 2 with its ends supported on the housing side and being entrained by one or other side of the tensioning bolt 17 depending on the operating direction of the drive lever 3, 30, 300.

Still another feature of the invention resides broadly in the double-acting drive, characterised in that the tensioning bolt connecting the force-locking elements is designed as an eccentric.

Yet still another feature of the invention resides broadly in the double-acting drive, characterised in that the eccentric tensioning bolt is adjustable or elastically pretensioned and is designed to be self-adjusting.

Examples of components for seat reclining devices, which may be utilized in accordance with the embodiments of the present invention, may be found in the following U.S. Pat. Nos. 4,619,482 to Itsuki, entitled "Reclining Device for a Vehicle Seat"; 4,598,947 to Fourrey et al., entitled "Device for Adjusting the Relative Inclination of Two Elements, and in Particular of the Seat Base and Seat Back of an Automobile Seat"; and 4,366,983 to Klueting et al., entitled "Power Recliner".

All, or substantially all, of the components and methods of the various embodiments may be used in any combination with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. Seat for a motor vehicle, wherein said seat comprises:
   back rest means;
   seat cushion means;
   means for hingedly connecting said back rest means with said cushion means;
   said connecting means comprising:
   a shaft being connected to at least one of said back rest means and said cushion means;
   said shaft having a cylindrical contour;
   a double-acting drive for producing a rotary movement which takes place starting from a neutral position of a drive lever into one or other direction of rotation wherein the shaft is turned by the drive only as long as the drive lever is moving away from its neutral position whereas when the drive lever is swivelled towards its neutral position the shaft is not entrained, characterised in that two force locking elements which exert substantially oppositely directed forces on the shaft are provided to connect the drive lever and shaft wherein the force locking elements have force engagement areas which can be brought into engagement with the cylindrical contour of the shaft, and which have at least one articulated joint for interconnection, and that
   a) a rigid connection is provided directly between one of said force-locking elements and the drive lever or
   b) an articulated connection
      b1) is provided directly between one of said force-locking elements and the drive lever or
      b2) directly between two force-locking elements and the drive lever or
      b3) indirectly between two force-locking elements or the drive lever,
   wherein when using several articulated connections at least one articulated joint is designed as a rotary slide joint.

2. The seat according to claim 1 characterised in that one force-locking element is rigidly connected to the drive lever and is designed as a two-sided rocker lever, said rocker lever having an axis of symmetry and two lever ends, said lever ends forming force engagement areas with the outer cylindrical contour of the shaft wherein an articulated joint is mounted in the axis of symmetry of the rocker lever of the force-locking element.

3. The seat according to claim 1 characterised in that the force-locking elements completely enclose the shaft with an angle greater than 180°, as a closed ring, wherein its inner contour is designed to form force engagement areas with the cylindrical contour of the shaft.

4. The seat according to claim 3 characterised in that:
   the drive lever is connected, by way of the rotary slide joint, with one force-locking element;
   the rotary slide joint being formed by a bolt extending from said drive lever and an oblong hole disposed in said one force-locking element;
   the force engagement areas of said force-locking element being disposed lie on the shaft generally opposite from said rotary slide joint;
   a further articulated joint, formed by a bolt and round hole connects the two force-locking elements together whereby the force engagement areas of the second force-locking element lie in the vicinity of the rotary slide joint.

5. The seat according to claim 4, characterised in that:
   an elastic switch element is used which during swivel movement of the drive lever exerts a force directed against the swivel direction on the tensioning bolt of the force-locking elements in dependence on the swivel direction;
   said seat comprises means for housing said shaft, wherein a portion of said shaft extends from said housing means;
   said housing means comprises spring support means, said spring support means extending generally outwardly from said housing means;
   the elastic switch element is designed as a leg spring looping round the shaft with its ends supported generally on the spring support means and being entrained by one or other side of the tensioning bolt depending on the operating direction of the drive lever.

6. The seat according to claim 4 characterised in that the tensioning bolt connecting the force-locking elements is designed as an eccentric.

7. The seat according to claim 3 characterised in that the tensionsing bolt is eccentric, and the eccentric tensioning bolt is pretensioned and has means for being self-adjusting.

8. The seat according to claim 1 characterised in that:
an intermediate element is connected on one side by said rotary slide joint, said rotary slide joint being formed by a bolt and an oblong hole, to the lever and on the other side by two further rotary slide joints, preferably formed by bolts and holes, to the force-locking elements; and
the holes of one of the force-locking elements comprise a pair of openings;
the holes of the other of the force-locking elements comprise another pair of openings;
the bolts lying on a circular arc;
the pair of openings of the one of the force-locking elements extends, starting from the circular arc on which the bolts lie, in the direction of the shaft axis, and the openings of the other force-locking element extend in the opposite direction, and the width of the openings is greater than the diameter of the bolt.

9. The seat according to claim 1, wherein there is a friction value between the force engagement areas and the shaft, and further wherein:
the drive lever is mounted concentric on the shaft and is connected by said rotary slide joint to an intermediate element which has two bolts which are mounted at a distance from each other in dependence on the friction value between the force engagement faces and shaft and engage in openings of the two force-locking elements and thus form said rotary slide joint, said rotary slide joint being in the form of a double rotary slide joint;
said shaft has a longitudinal axis defined therethrough;
the force engagement faces of that force-locking element which is drawn in the direction of the bolts lie on a first side of the shaft axis whilst the force engagement surfaces of the other force-locking element which is pressed away from the bolts onto the shaft lie on a second side of the shaft axis, the second side being opposite the first side;
said bolts lie on a circular arc with respect to the shaft axis;
the openings of the one force-locking element comprise a pair of openings and extend, starting from the circular arc on which the bolts lie, in the direction of the shaft axis;
the openings of the other force-locking element extend in the opposite direction;
the width of the openings is greater than the diameter of the bolt; and
each force engagement area of each force-locking element comprises a partial circular surface, the partial circular surface for matching, and for being engageable with, the cylindrical contour of the shaft.

10. The seat according to claim 1 characterised in that:
the shaft is hollow and has an inner cylindrical contour;
the two force-locking elements are each generally heart-shaped and each have a wide side and a narrow side;
the two force-locking elements are mounted inside a hollow shaft wherein they have force engagement areas set symmetrical with their wide side and the inner cylindrical contour of the hollow shaft;
an entrainment bolt forms, at the tip of the heart-shaped force-locking element, with an oblong hole of the lever, the rotary slide joint; and
the tensioning bolt set on the tip of the force-locking element engages in a round hole in the wide side of the other force-locking element.

11. The seat according to claim 10 characterised in that the tensioning bolt connecting the force-locking elements is designed as an eccentric.

12. The seat according to claim 10, characterized in that an elastic switch element is used which during swivel movement of the drive lever exerts a force directed against the swivel direction on the tensioning bolt of the force-locking elements in dependence on the swivel direction.

13. The seat according to claim 1 characterised in that:
the force-locking elements are flexible, e.g. designed as bands, cables or the like, and loop round the shaft;
there are tensioning bolts which are mounted on an intermediate element in spaced apart relation with one another and are aligned radially with respect to the shaft axis;
each of the force-locking elements has an end, the end of each of said force-locking element having openings to accommodate said tensioning bolts;
the end of each of the force-locking elements being connected simultaneously with both of said tensioning bolts;
an elastic switch element is used which, during swivel movement of the drive lever, exerts a force directed against the swivel direction on the tensioning bolt of the force-locking elements in dependence on the swivel direction.

14. The seat according to claim 1 characterised in that the at least one articulated joint is mounted on a preferably ring-like intermediate element with which is associated on the opposite side a rotary slide joint for fixing the intermediate element on the drive lever.

15. The seat according to claim 1 characterised in that the drive lever is connected by the rotary slide joint, which is advantageously formed by a bolt and an oblong hole, with the one force-locking element whose force engagement areas lie on the opposite side of the shaft on which a further articulated joint, preferably formed by a bolt and round hole connects the two force-locking elements together whereby the force engagement areas of the second force-locking element lie on the side of the rotary slide joint.

16. Seat for a motor vehicle, said seat comprising:
back rest means;
seat cushion means;
means for hingedly connecting said back rest means with said seat cushion means;
said connecting means comprising:
lever means and fulcrum means, said lever means being pivotable about said fulcrum means;
said lever means comprising a handle portion for receiving a force to pivot said lever means about said fulcrum means;
said lever means having means for being initially disposed in a rest position with respect to said fulcrum means;
said lever means being pivotable about said fulcrum means, in a first rotational direction and a second rotational direction, the first rotational direction being opposite to the second rotational direction;

said fulcrum means comprising shaft means;

said shaft means being connected to at least one of said back rest means and said seat cushion means for permitting the transfer of a pivoting movement to said at least one of said back rest means and said seat cushion means;

means for applying a grasping force at two substantially diametrically opposite portions of said shaft means in response to pivotal displacement of said lever means in one of the first and second directions, from a rest position;

said means for applying a grasping force further comprising:
  means for pivotally displacing said shaft means, with said grasping force, in response to continued pivotal displacement of said lever means subsequent to the grasping of said shaft means; and
  means for releasing the grasping force at said two substantially diametrically opposite portions of said shaft means upon displacement of said lever means towards said rest position.

17. The motor vehicle seat according to claim 16, wherein said means for applying a grasping force comprises at least one intermediary component, said at least one intermediary component being separate from said lever means and having means for converting pivotal displacement of said lever means into said grasping force.

18. The motor vehicle seat according to claim 17, wherein:
  said at least one intermediary component comprises a first intermediary component and a second intermediary component;
  said connecting means further comprises:
    first joint means for directly and movably connecting said lever means and said first intermediary component; and
    second joint means for directly and movably connecting said first intermediary component and said second intermediary component;
  said first intermediary component comprises a first grasping surface;
  said second intermediary component comprises a second grasping surface; and
  said first grasping surface and said second grasping surface being configured for applying said grasping force, in conjunction with one another, at a pair of substantially diametrically opposite portions of said shaft means in response to pivotal displacement of said lever means in one of the first and second directions from the rest position.

19. The motor vehicle seat according to claim 18, wherein:
  said first intermediary component further comprises a third grasping surface;
  said second intermediary component further comprises a fourth grasping surface;
  said third grasping surface and said fourth grasping surface being configured for applying a grasping force, in conjunction with one another, at an additional pair of substantially diametrically opposite portions of said shaft means in response to pivotal displacement of said lever means in the other of the first and second directions from the rest position.

20. The motor vehicle seat according to claim 19, wherein:
  said shaft means comprises a generally cylindrical shaft being directly connected to said at least one of said back rest means and said seat cushion means;
  said shaft having an external surface, said external surface being generally cylindrical;
  said first intermediary component comprises a first closed ring being disposed about said shaft, said first closed ring having a first radially inwardly disposed surface portion;
  said second intermediary component comprises a second closed ring being disposed about said shaft, said second closed ring having a second radially inwardly disposed surface portion;
  said first grasping surface comprising a portion of said first radially inwardly disposed surface portion;
  said third grasping surface comprising an additional portion of said first radially inwardly disposed surface portion;
  said second grasping surface comprising a portion of said second radially inwardly disposed surface portion;
  said fourth grasping surface comprising an additional portion of said second radially inwardly disposed surface portion;
  said first and second grasping surfaces being configured for applying a grasping force, in conjunction with one another, at a first pair of substantially diametrically opposed portions on said external surface of said shaft, in response to pivotal displacement of said lever means in the first direction from the rest position;
  said third and fourth grasping surfaces being configured for applying a grasping force, in conjunction with one another, at a second pair of substantially diametrically opposed portions on said external surface of said shaft, in response to pivotal displacement of said lever means in the second direction from the rest position;
  said first radially inwardly disposed surface portion has a generally annular shape;
  said first and third grasping surfaces are each generally straight and flat, and are each disposed as secants across the generally annular shape of said first radially inwardly disposed surface portion;
  said second radially inwardly disposed surface portion has a generally annular shape;
  said second and fourth grasping surfaces are each generally straight and flat, and are each disposed as secants across the generally annular shape of said second radially inwardly disposed surface portion;
  said shaft has a central rotational axis;
  said first joint means comprises:
    first bolt means extending from said lever means;
    slot means being disposed in said first closed ring;
    said slot means slidably accommodating said first bolt means;
    said slot means being oriented along a radius of said first closed ring to permit sliding of said slot means, along said first bolt means, away from the rotational axis of said shaft during pivotal movement of said lever means in the first direction;
  said second joint means comprises:
    second bolt means extending from said first closed ring;
    a round hole being disposed in said second closed ring;

said round hole rotatably accommodating said second bolt means;
said motor vehicle seat further comprises means for rotatably bearing said shaft;
said means for releasing the grasping force comprises:
  third bolt means extending from said bearing means;
  an elastic switch element for:
    providing a rotational biasing force against said second bolt means during displacement of said lever means in said first direction, to displace said lever means towards the rest position upon removal of the force from said handle portion of said lever means; and
    providing a rotational biasing force against said second bolt means during displacement of said lever means in said second direction, to displace said lever means towards the rest position upon removal of the force from said handle portion of said lever means;
said elastic switch element comprising a hairpin spring;
said hairpin spring comprising a generally annular portion disposed about said shaft and two spaced apart leg portions extending radially away from said generally annular portion;
said second bolt means extending through said round hole to be directly flanked by said leg portions in the rest position of said lever means;
a first of said leg portions being configured for providing a rotational biasing force against said second bolt means during displacement of said lever means in the first direction; and
a second of said leg portions being configured for providing a rotational biasing force against said second bolt means during displacement of said lever means in the second direction; and said shaft being connected to said back rest means to transmit a pivoting movement solely to said back rest means.

* * * * *